United States Patent [19]
Ford

[11] Patent Number: 5,340,035
[45] Date of Patent: Aug. 23, 1994

[54] COMBINATION CHIPPER AND SHREDDER APPARATUS AND LAWN VACUUM MACHINE

[76] Inventor: Stuart N. Ford, 998 Manakin Rd., Manakin, Va. 23103

[21] Appl. No.: 856,409

[22] Filed: Apr. 13, 1992

[51] Int. Cl.⁵ .............................. B02C 13/10
[52] U.S. Cl. ............................ 241/55; 241/58; 241/101.7; 241/285.2; 241/285.3
[58] Field of Search ........... 241/56, 58, 101.7, 285.2, 241/285.3, 55; 56/13.1, 13.2, DIG. 8

[56] References Cited

U.S. PATENT DOCUMENTS

| | | |
|---|---|---|
| 885,177 | 4/1908 | Powell . |
| 1,828,490 | 10/1931 | Clement . |
| 2,004,367 | 6/1935 | Brown . |
| 2,247,665 | 7/1941 | Ottersland . |
| 3,000,578 | 9/1961 | Riches et al. . |
| 3,572,594 | 3/1971 | Kershaw . |
| 3,688,479 | 9/1972 | Martinson et al. ............... 56/13.2 |
| 3,817,462 | 6/1974 | Hamlin ........................... 241/101.7 |
| 3,929,236 | 12/1975 | Koturov ......................... 241/55 |
| 4,074,869 | 2/1978 | Johnson ......................... 241/55 |
| 4,720,051 | 1/1988 | Graveman et al. ............. 241/186.3 |
| 4,827,989 | 5/1989 | Strong ........................... 144/176 |
| 4,834,302 | 5/1989 | Baker ............................. 241/92 |
| 4,951,882 | 8/1990 | Ober ............................... 241/55 |
| 4,958,775 | 9/1990 | Arasmith ........................ 241/88.1 |

Primary Examiner—Mark Rosenbaum
Assistant Examiner—John M. Husar
Attorney, Agent, or Firm—Stephen E. Feldman

[57] ABSTRACT

A combination chipper and shredder apparatus and lawn vacuum is obtained by providing an input chute or hopper on the machine that is movable to either of two positions by coupling the input chute to the wall of the chipping and shredding chamber with a coupling that permits the chute to be adjustably rotated, with respect to the coupling, but remain in full communication with the chipping and shredding chamber. With the mouth of the chute facing upward the machine may be operated in the chipping and shredding mode and with the mouth of the chute facing downward the machine may be operated in the lawn vacuum mode.

14 Claims, 3 Drawing Sheets

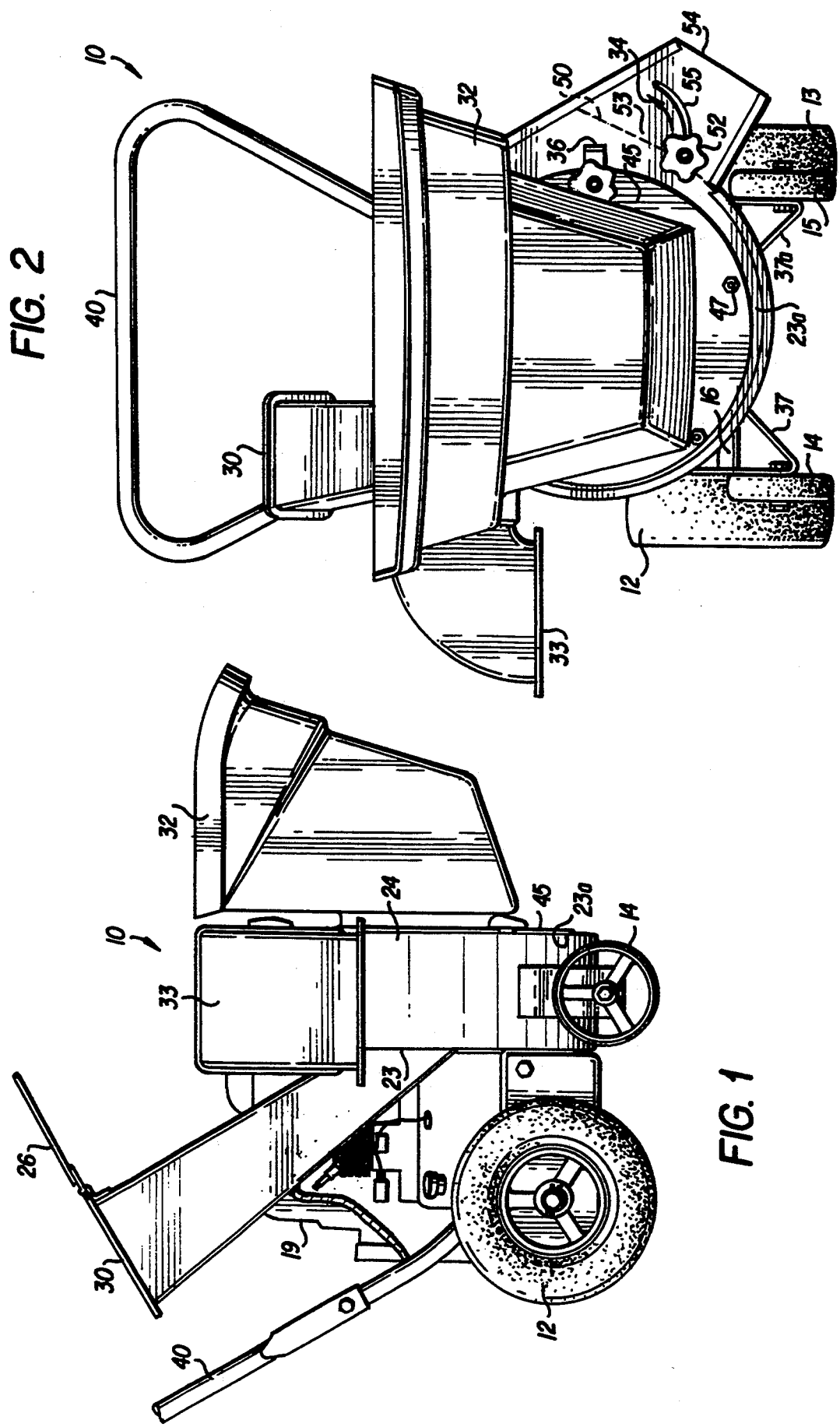

COMBINATION CHIPPER AND SHREDDER APPARATUS AND LAWN VACUUM MACHINE

BACKGROUND OF THE INVENTION

1. Field of the Invention

The present invention relates to lawn, garden debris, leaf, brush and limb disposal apparatus. More particularly the present invention relates to an improved apparatus which provides for combining or integrating a lawn, garden debris, leaf, brush and limb disposal apparatus and a lawn and leaf vacuum into a unitary apparatus.

2. Prior Art

Lawn, garden debris, leaf, brush and limb disposal apparatus, generally referred to as chipper and shredder apparatus, has been known for many years. Over the years the art has been improved and expanded. Some examples of the advance in the art may be seen by examining the following U.S. Pat. Nos.

| U.S. Pat. No. 885,177 | to Powell | 1908 |
| U.S. Pat. No. 1,828,490 | to Clement | 1931 |
| U.S. Pat. No. 2,004,367 | to Brown | 1935 |
| U.S. Pat. No. 2,247,665 | to Ottersland | 1941 |
| U.S. Pat. No. 3,000,578 | to Riches et al | 1961 |
| U.S. Pat. No. 3,572,594 | to Kershaw | 1971 |
| U.S. Pat. No. 4,827,989 | to Strong | 1989 |
| U.S. Pat. No. 4,834,302 | to Baker | 1989 |
| U.S. Pat. No. 4,951,882 | to Ober | 1990 |

Certain of the above mentioned patents, such as U.S. Pat. Nos. 885,177; 1,828,490; 2,247,665; 4,827,989; 4,834,302; and 4,951,882 are examples of patents that teach and disclose apparatus that may be used to reduce wood, such as tree limbs and other wood or other hard garden material to relatively small pieces or chips. Others of the above mentioned patents, such as U.S. Pat. Nos. 2,004,367; 3,000,578; and 3,572,594 are examples of patents that teach and disclose wood comminuting apparatus usable in chipping and shredding apparatus. Each of the above patents disclose examples of prior art apparatus which includes a driven cutter and/or chipper which cuts into and makes chips out of wood. The driven cutter or chipper generates a movement of air inside the chipping and shredding chamber while performing the cutting and/or chipping function. Although the air flow is secondary to the cutting and/or chipping function it is useful in evacuating the size-reduced matter from the compartment or area in which the cutting and/or chipping function is performed. The air flow translates into a blower at one end of the chamber and a vacuum at the other end. The U.S. Pat. No. 4,951,882, for example, discloses apparatus which makes use of the vacuum generated by the driven cutter and chipper to suck up or vacuum leaves from the ground. The vacuum mode is created by attaching an accessory hose to the vacuum side of the chamber containing the chipping and shredding assembly. The entire chipping and shredding apparatus and its drive means are mounted on the back or bumper of a pick-up truck, and the apparatus is made mobile by moving the truck supporting the chipping and shredding apparatus. The area over which the vacuum is useful is a function of the length of the hose attached to the chipper and shredder chamber of the chipper and shredder apparatus. Although the proposed apparatus appears practical, the apparatus itself is cumbersome, requires a truck to move the apparatus from one area to another, is greatly limited in its mobility and is not suitable for home garden use.

SUMMARY OF THE INVENTION

The present invention provides a greatly improved chipper and shredder apparatus which may be operated in a chipping and shredding mode and in the lawn and garden vacuum mode, according to orientation of some of the components of the apparatus. The apparatus, which is self-contained, is portable and fully mobile. Attachment and/or detachment of necessary or auxiliary components is avoided. Although the two modes of operation are individual, conversion from a first mode of operation, for example, the chipping and shredding mode, to a second mode of operation, for example the vacuum mode, is accomplished by simple adjustment of normal, external components.

In a preferred form of the present invention a chipper and shredder apparatus is provided with a uniquely structured and uniquely mounted intake chute or hopper. The uniquely structured hopper functions, in one mode of operation, as an intake hopper for receiving matter to be reduced in size or comminuted by the chipping and shredding assembly and functions in the second mode of operation as the mouth of a vacuum, such as a lawn vacuum. The unique hopper mounting provides for securing the hopper on to the wall of the chipping and shredding chamber at a first desired, lockable position and orientation, relative to the ground over which the apparatus is maneuvered, for one mode of operation, with provision for repositioning the hopper, in the unique mounting, to a second desired lockable position and orientation relative to the ground over which the apparatus is maneuvered, for the second mode of operation.

Generally the apparatus of the present invention includes a drive means, such as an internal combustion engine, for example, mounted on a movable platform. Mobility is provided by two pair of wheels on which the platform mounted. A handle, connected to the axle of one pair of wheels, provides a means to push and/or steer the apparatus. The drive means is connected to a chipper and shredder assembly which assembly is mounted in a chipping and shredding chamber. The chipper and shredder assembly includes a flywheel on which is mounted chipping and shredding components for reducing the size or comminuting matter introduced into the chipping and shredding chamber. The flywheel of the assembly is mounted on a shaft so as to rotate with the shaft. The shaft is connected to the drive means which rotates the shaft when the drive means is operated. Also mounted on the flywheel are a plurality of fan blades which rotate with the flywheel and generate air flow into, through and out of the chipping and shredding chamber. An input chute or hopper is coupled to the exterior wall of a chipping and shredding chamber with the output end of the chute in communication with the inlet opening or port of the chipping and shredding chamber for introducing matter or material into the chipping and shredding chamber. Evacuation of the chamber is accomplished by blowing the chipped and shredded matter through the outlet opening of the chipping and shredding chamber.

The chipper and shredder apparatus is operated by operating the drive means and, through appropriate coupling, the drive means drives the chipper and shredder assembly rotationally. Rotation of the chipper and shredder assembly in the chipping and shredding chamber generates an air flow through the chamber which translates into a vacuum at the input end of the chamber and a blower at the output end of the chamber.

Connected to the input of the chipping and shredding chamber is an input chute or hopper. The hopper is a discrete component uniquely mounted on the external wall of the chipping and shredding chamber so that the outlet of the hopper is in constant communication with the inlet of the chamber. The mounting of the hopper permits arcuate orientation of the hopper from a first position, with the mouth or input of the hopper in upright position, to a second position, with the mouth or input of the hopper in a down position, providing for a shift of hopper position of up to 360 degrees, without removing the hopper from its mounting. Preferably orientation of the hopper between up-right and down facing positions is accomplished on a virtual axis, the virtual axis being a projection of the axis of the shaft on which the chipper and shredder assembly is mounted.

The chute or hopper is adjustably connected to the wall of the chipping and shredding chamber so that the output end of the hopper and the input end of the chamber are in constant communication. Preferably, a locking means is provided to secure the hopper in either a first or a second position, as selected, that is, with the mouth of the hopper oriented in an upward position or the mouth of the hopper oriented in a downward position, relative to the inlet port opening of the chipping and shredding chamber. With the mouth of the hopper oriented upward, the hopper serves as a hopper or chute for feeding matter into the chipping and shredding chamber so that the matter so fed may be comminuted by the chipper and shredder assembly rotated in the chamber. With the mouth of the hopper oriented downward, the hopper mouth is suspended slightly above the ground or lawn over which the apparatus is moved and the hopper serves as a vacuum intake, drawing leaves and/or lawn and garden debris into the hopper and into the chipping and shredding chamber. The material so drawn into the chamber may be chipped and/or shredded and/or comminuted and blown out of the chipping and shredding chamber into a vacuum bag or debris receiving bag or container.

The hopper is preferably of such size and length that when the hopper is positioned in a mouth downward position, the mouth of the hopper is spaced from the ground, over which the wheels of the machine or apparatus are rolling or directed, so that the flow of air drawn into the mouth of the hopper, from the air flow generated in the chipping and shredding chamber, has a vacuum effect, sucking debris and/or leaves from the area substantially covered by the mouth, into the machine.

A collector or vacuum bag may be attached to the outlet port or opening of the chipping and shredding chamber or the extension thereof, so that debris vacuumed from the lawn and/or ground over which the apparatus is directed and/or moved, is collected or bagged.

By adjustably mounting the hopper or input chute of the chipper and shredder apparatus so that the hopper may serve the dual function of an input for receiving matter and/or debris to be comminuted by the chipper and shredder assembly of a chipper and shredder apparatus and as a mouth for a vacuum machine, a highly mobile and portable combination chipper and shredder machine and lawn vacuum is provided. Additionally, the lawn vacuum of the combination machine has the added capability of chipping and/or shredding the leaves and other debris, picked up by the lawn vacuum, into mulch before expelling the matter from the machine into the collection bag.

BRIEF DESCRIPTION OF THE DRAWINGS

FIG. 1 is a representation of the present invention, as viewed from the side of the invention, with the hopper in upright position;

FIG. 2 is a representation of the invention shown in FIG. 1, as viewed from the front of the invention;

DETAILED DESCRIPTION OF THE INVENTION

Figure 5:
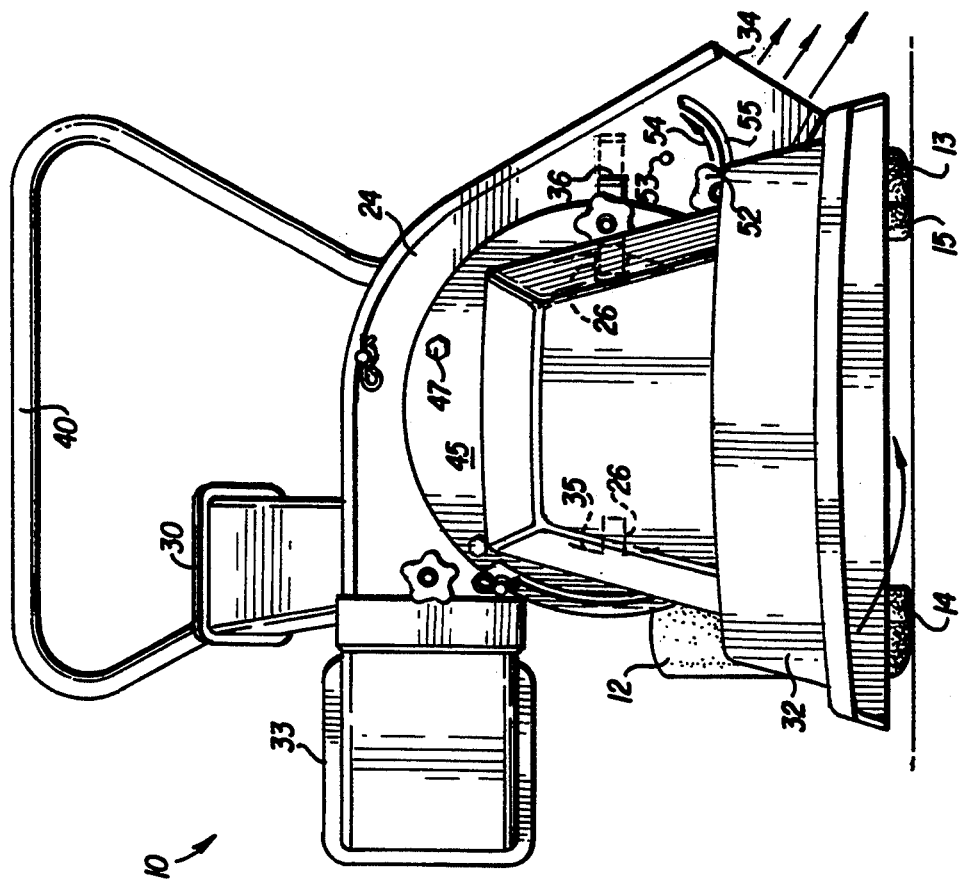
FIG. 5 is a representation of the invention shown in FIG. 4, as viewed from the front of the invention; and, FIG. 6 is a representation, in cross-section, of part of one type of mounting that may be used to mount the hopper to the chipping and shredding chamber.
Figure 3:
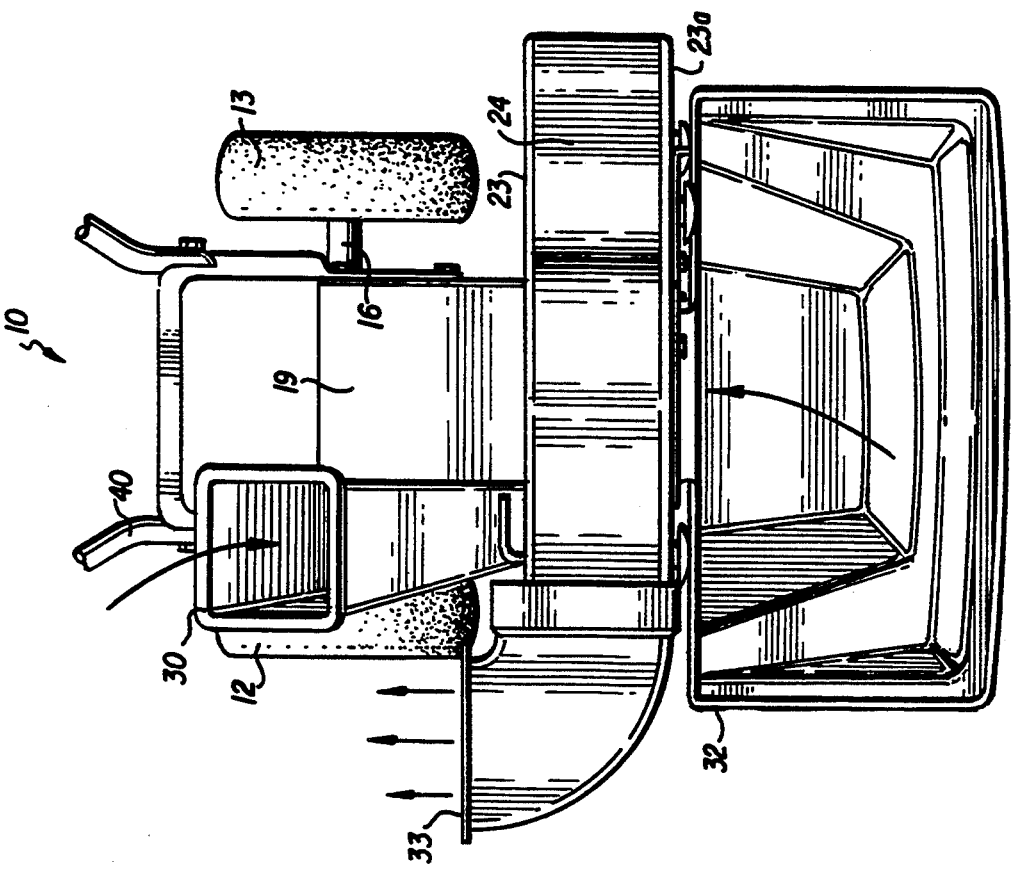
FIG. 3 is a representation of the invention shown in FIG. 1, as viewed from above the invention.
Figures 4, 6:
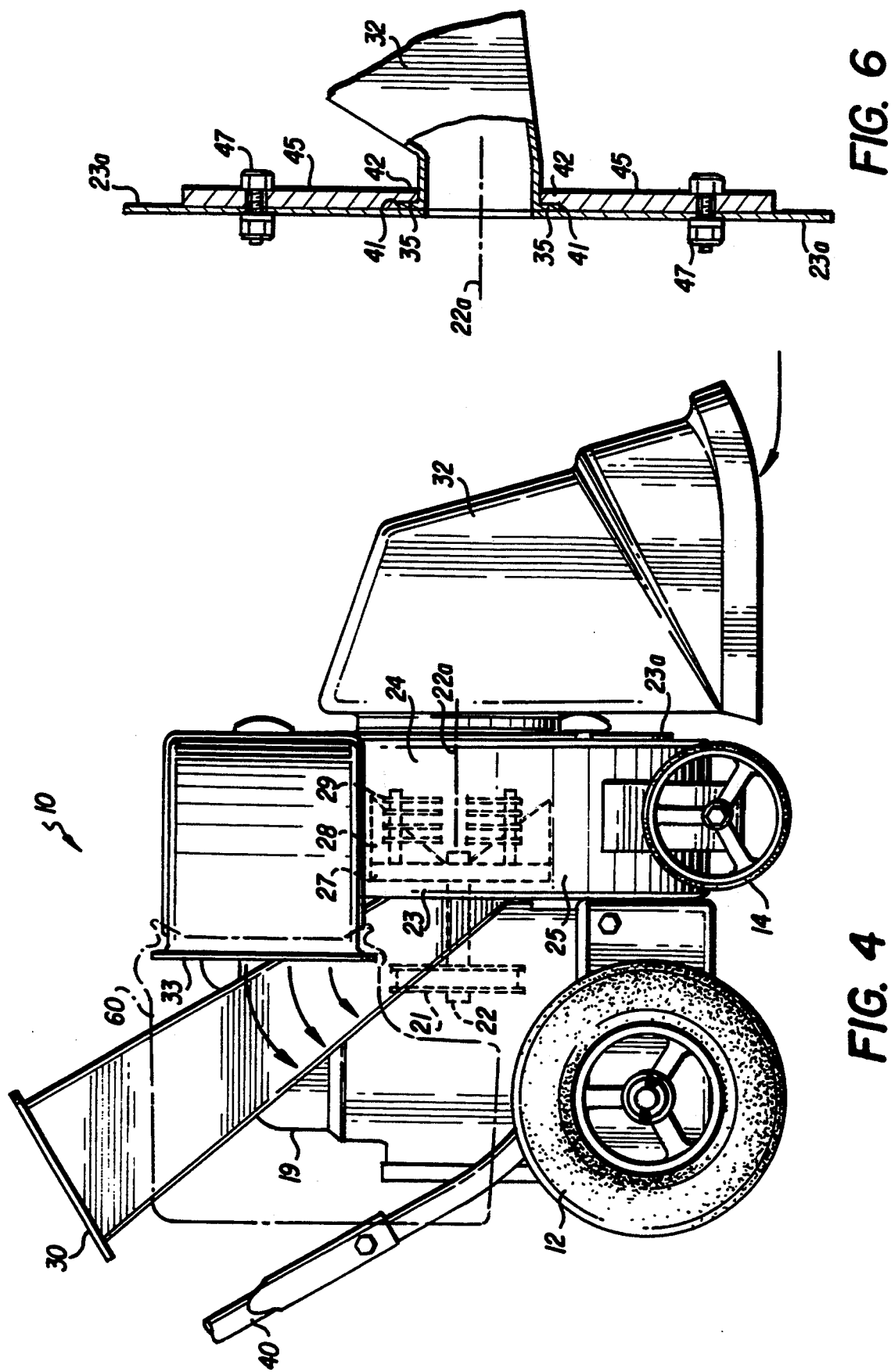
FIG. 4 is a representation of the invention, as viewed from the side, with the hopper in downward position.

It is to be noted that throughout the drawings, identical call-outs are used to identify the same or similar components. Referring to the drawings, FIGS. 1 through 5, inclusive, represent the same apparatus or machine, however, FIGS. 1, 2 and 3 represent the apparatus or machine set up in a chipper and shredder mode of operation while FIGS. 4 and 5 represent the apparatus or machine set up in the lawn vacuum mode of operation.

Generally, in each of the FIGS. 1–5, a portable, mobile combination chipper and shredder apparatus and lawn vacuum machine 10 is represented. Two pair of wheels 12/13 and 14/15 are provided to support and carry an internal combustion engine 18, located under a cover 19. The internal combustion engine drives a conventional pulley which is coupled to a drive pulley 21 coupled to a shaft 22. The shaft passes through the wall 23 of the chipping and shredding chamber 24. The chamber houses the chipper and shredder assembly 25 which includes a fly wheel 27, fan blades 28 and flailing blades 29.

The chipper and shredder assembly may be the same or similar to the chipper and shredder assembly disclosed in my co-pending U.S. patent application Ser. No. 07/823,335, filed Jan. 21, 1992, now abandoned, titled Chipper and Shredder Assembly for Chipper and Shredder Apparatus or may be similar to the chipping and shredding apparatus disclosed in U.S. Pat. No. 3,572,594 or 4,834,302 or 4,951,882, for example.

The chipping and shredding chamber includes two input chutes 30 and 32 and two output 33 and 34. The input chute 30 is used primarily for introducing limbs and/or branches into the chipping and shredding chamber, while the input chute 32 is used primarily for introducing bulky material and/or matter into the chipping and shredding chamber.

The internal combustion engine 18 and the chipping and shredding chamber are supported on the wheels 12/13 and 14/15 through the use of a conventional platform mounted on the axial 16 of the wheels 12/13. The front pair of wheels 14/15 are mounted on a pair of brackets 37 and 37a coupled to the bottom of the chipping and shredding chamber wall. Preferably the invention includes two pair of wheels as represented, however, a skid or a pair of skids may be substituted for the front wheels 14/15, if desired.

A handle, 40 is connected to the platform or to the axle 16 to facilitate moving and/or steering the mobile unit, as desired.

The internal combustion engine 18 is represented as including a spark plug in a cylinder head and other conventional components and/or accessories usually associated with internal combustion engines.

The chipping and shredding chamber is represented as including an intake chute 30 which opens at its bottom into the chamber through wall 23 of the chamber. The intake chute 30 includes a cover 26 which may be used to close off the intake chute 30, if desired. A second intake chute or hopper 32 is coupled to the opposite wall 23a of the chirping and shredding chamber. The hopper 32 is mounted on the chamber wall 23a so that the hopper may be rotated on an axis 22a, which is the virtual projection of the shaft 22, as clearly shown in FIG. 4. As represented in FIG. 6, the hopper 32 has a flanged opening 35 at the output end thereof, by which the bopper is coupled to the wall 23a of the chamber in association with the mounting ring 45. The shouldered mounting ring 45, is mounted on the wall 23a by nut and bolt couplings 47. The shoulder 41 of the mounting ring 45 abuts the perimeter of the flange 35 and the extension 42 of the shoulder 41 covers and secures the flange 35 to the chamber wall so that the flange, while held in position over the opening in the chamber wall, may be rotated within the mounting ring 45.

The flange 35 includes detentes or slots 26 which are spaced 180 degrees and provide a detente for a locking mechanism for holding the hopper in an upright position, as seen in FIG. 1, for example, or in a down position, as seen in FIG. 4, for example.

A locking slide or latch 36 may be slid or moved into the detente 26 for locking the hopper in position as desired. A hand turned crank and threaded shaft are used to tighten and loosen the slide 36, so that the slide may be moved or held tight, as desired.

The chipping and shredding chamber also includes two outlets 33 and 34. The outlet 34 includes a shut off gate or plate 50, connected to a hand crank/shaft 52. The shut off gate pivots at the pivot point 53. The gate may be opened, so as to utilize the outlet, by moving the crank 52 along the slot 55 in the direction of the arrow 54, or the gate may be used to close the outlet, as represented in FIG. 2.

The outlet 33 is mounted at the outlet opening of the chipping and shredding chamber so as to be rotatable on the chamber outlet, such as seen in FIG. 4, for example, where the outlet is facing the reap of the chipper and shredder apparatus and in FIG. 1, for example, where the outlet 33 is shown rotated 90 degrees, so that the outlet faces down.

It will be noted that a vacuum bag 60, shown in broken line form may be secured to one of the outlets, preferably the outlet 33, so as to catch and retain any debris that is expelled from the outlet to which the bag is attached, as desired. This is especially useful when the machine is operating or set up in the vacuum mode, as represented in FIG. 4, for example.

When operating the apparatus in the vacuum mode, it may be desired to close the opening of the intake chute 30 by using the hinged cover 26. This will increase the vacuum power through the hopper 32.

It should be kept in mind that when the shut off gate 50 is moved to open the outlet 34, the outlet 33 is effectively closed and the combination machine may be used as a blower because the air flow drawn through the chipping and shredding chamber is blown out the outlet 34.

Although it 1s preferred to employ two pair of wheels to maintain the machine at a constant position above the ground and to make moving and steering easy, one or more skids may be used, if desired. Although the preferred embodiment of the invention includes an internal combustion engine as a power supply an alternate form of the invention may substitute an electric motor for a source of drive power. Other improvements, such as a power drive to provide a self driven machine may also be added. other changes and modification may be made as will become apparent to those skilled in the art without departing from the invention.

What is claimed is:

1. A combination chipper and shredder apparatus and vacuum machine comprising:
    a) a housing having a first wall and a second wall defining a chipping and shredding chamber for housing a chipper and shredder assembly, said housing including an inlet port and an outlet port;
    b) a drive means coupled to said chipper and shredder assembly by a drive assembly, said drive assembly including a drive shaft, part of which extends into said chipping and shredding chamber and is coupled to said chipper and shredder assembly for driving said chipper and shredder assembly;
    c) a chute means having an input end and an output end, said chute means for directing matter introduced into said chute means via said input end thereof, to said chipping and shredding chamber via said inlet port; and,
    d) a coupling means for coupling said chute means to said first wall of said housing so that said output end of said chute means is in communication with said inlet port of said housing, said coupling means for permitting rotational movement by said chute means on said first wall for rotating said chute means about said inlet port from a first position, relative to said housing to a second position relative to said housing.

2. A combination as in claim 1 and in which said drive shaft coupled to said chipper and shredder assembly drives said chipper and shredder assembly rotationally and in response to operation of said drive means.

3. A combination as in claim 1 and in which when said chute means is in said first position, said combination chipper and shredder apparatus and vacuum machine is in a chipper and shredder mode and when said chute means is in said second position said combination chipper and shredder apparatus and vacuum machine is in a vacuum mode.

4. A combination as in claim 1 and in which when said chute means is in said first position said input end of said chute means is in an upward facing position and said combination chipper and shredder apparatus and said vacuum machine is in a chipper and shredder mode of operation and when said chute means is in said second position said input end of said chute means is in a downward facing position and said combination chipper and shredder apparatus and vacuum machine is in a vacuum mode of operation.

5. A combination as in claim 1 and further including a bag means and a bag coupling means, said bag coupling means for coupling said bag means to said outlet port of said chipping and shredding chamber for receiving and storing matter evacuated from said chipping and shredding chamber.

6. A combination as in claim 1 and further including support means for supporting said housing and said drive means above the ground over which said combination chipper and shredder apparatus and vacuum machine is moved, said support means including at least a pair of wheels for providing mobility to said combination chipper and shredder apparatus and vacuum machine.

7. A combination as in claim 1 and in which said drive means is an internal combustion engine.

8. A combination as in claim 1 and in which said drive means is an electric motor.

9. A combination chipper and shredder machine and vacuum machine comprising:
   a) a housing having a first wall, a second wall, an inlet port and an outlet port combining to define a chipping and shredding chamber, said chipping and shredding chamber for housing a chipper and shredder assembly, said chipper and shredder assembly for chipping and shredding matter introduced into said chipping and shredding chamber through said inlet port;
   b) a drive means mounted adjacent said housing and coupled to said chipper and shredder assembly for driving said chipper and shredder assembly rotationally on an axis passing through said chipper and shredder assembly, said drive means including a shaft extending through said second wall of said housing;
   c) a hopper having an input end and an output end, said hopper coupled to said first wall of said housing for maintaining communication between said inlet port of said housing and said output end of said hopper, for directing matter introduced into said hopper via said input end to said chipping and shredding chamber via said inlet port; and
   d) a coupling means for coupling said hopper to said first wall of said housing, said coupling means for permitting said hopper to be rotated on a second axis which is on a plane parallel to said axis, while maintaining communication between said inlet port of said housing and said output end of said hopper.

10. A combination as in claim 9 and in which said drive means is an internal combustion engine.

11. A combination as in claim 9 and in which said drive means is an electric motor.

12. A combination as in claim 9 and in which said coupling means for coupling said hopper to said first wall of said housing permits said hopper to be rotated between a first position, with said input end elevated above said second axis and a second position with said input end of said hopper positioned below said second axis.

13. A combination as in claim 12 and wherein when said hopper is in said first position, said combination chipper and shredder machine and vacuum machine is in a chipping and shredding mode and when said hopper is in said second position, said combination chipper and shredder machine and vacuum machine is in a vacuum mode.

14. A combination chipper and shredder apparatus and vacuum machine comprising:
   a) a housing having a first wall and a second wall defining a chipping and shredding chamber for housing a chipper and shredder assembly, said housing including an inlet port and an outlet port;
   b) a drive means coupled to said chipper and shredder assembly by a drive assembly, said drive assembly including a drive shaft, part of which extends into said chipping and shredding chamber and is coupled to said chipper and shredder assembly for driving said chipper and shredder assembly;
   c) a chute means having an input end and an output end, said chute means for directing matter introduced into said chute means via said input end thereof, to said chipping and shredding chamber via said inlet port;
   d) a coupling means for coupling said chute means to said first wall of said housing so that said output end of said chute means is in communication with said inlet port of said housing, said coupling means permitting movement between said chute means and said first wall so that said chute means may be rotated in said coupling means from a first position to a second position relative to said housing; and
   e) said chute means at said output end includes a flange member extending from said output end and said coupling means includes an inside shoulder and an extension therefrom and said inside shoulder is adapted to abut an outer perimeter of said flange member and said extension is adapted to capture said flange member.

* * * * *

REEXAMINATION CERTIFICATE (3183rd)

United States Patent [19]

Ford

[11] B1 5,340,035
[45] Certificate Issued May 6, 1997

[54] COMBINATION CHIPPER AND SHREDDER APPARATUS AND LAWN VACUUM MACHINE

[75] Inventor: Stuart N. Ford, Manakin, Va.

[73] Assignee: Studley Products Corp., Richmond, Va.

Reexamination Request:
No. 90/003,922, Aug. 11, 1995

Reexamination Certificate for:
Patent No.: 5,340,035
Issued: Aug. 23, 1994
Appl. No.: 856,409
Filed: Apr. 13, 1992

[51] Int. Cl.$^6$ ................................................ B02C 13/10
[52] U.S. Cl. .................... 241/55; 241/58; 241/101.78; 241/285.2; 241/285.3
[58] Field of Search ..................... 241/55, 56, 58, 241/101.78, 285.2, 285.3; 56/13.1, 13.2, DIG. 8; 15/337, 347, 359

[56] References Cited

U.S. PATENT DOCUMENTS

| | | | |
|---|---|---|---|
| 3,618,157 | 11/1971 | Bassin | 15/330 |
| 3,813,725 | 6/1974 | Rinker | 15/347 |
| 4,074,869 | 2/1978 | Johnson | 241/55 |
| 4,951,882 | 8/1990 | Ober | 241/55 |
| 5,231,827 | 8/1993 | Connolly et al. | 56/13.1 |
| 5,381,970 | 1/1995 | Bold et al. | 241/55 |

*Primary Examiner*—John M. Husar

[57] ABSTRACT

A combination chipper and shredder apparatus and lawn vacuum is obtained by providing an input chute or hopper on the machine that is movable to either of two positions by coupling the input chute to the wall of the chipping and shredding chamber with a coupling that permits the chute to be adjustably rotated, with respect to the coupling, but remain in full communication with the chipping and shredding chamber. With the mouth of the chute facing upward the machine may be operated in the chipping and shredding mode and with the mouth of the chute facing downward the machine may be operated in the lawn vacuum mode.

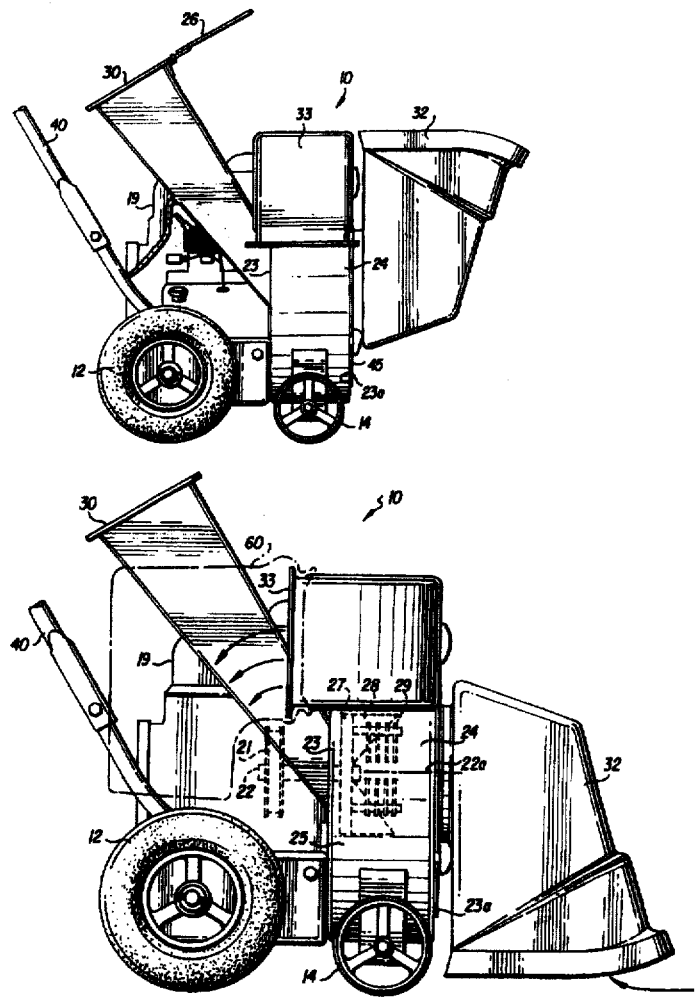

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 14 is confirmed.

Claims 1, 3, 4 and 9 are determined to be patentable as amended.

Claims 2, 5–8 and 10–13, dependent on an amended claim, are determined to be patentable.

New claims 15 and 16 are added and determined to be patentable.

1. A combination chipper and shredder apparatus and vacuum machine comprising:
    a) a housing having a first wall and a second wall defining a chipping and shredding chamber for housing a chipper and shredder assembly, said housing including an inlet port and an outlet port;
    b) a drive means coupled to said chipper and shredder assembly by a drive assembly, said drive assembly including a drive shaft[, part of which extends] *defining a first axis longitudinally disposed with respect to said combination chipper and shredder apparatus and vacuum machine, said drive shaft extending* into said chipping and shredding chamber and [is] coupled to said chipper and shredder assembly for driving said chipper and shredder assembly;
    c) a chute means having an input end and an output end, said chute means for directing matter introduce into said [chute means via said] input end [thereof,] to said chipping and shredding chamber via said inlet port; and
    d) a coupling means for coupling said chute means to said first wall of said housing so that said output end [of said chute means] is in communication with said inlet port [of said housing, said coupling means], *and* for permitting rotational movement [by] *of* said chute means [on said first wall for rotating said chute means about said inlet port from a first position, relative to said housing to a second position relative to said housing] *about a second axis, said second axis being a virtual projection of said drive shaft.*

3. A combination as in claim 1 and in which when said chute means is in [said] *a* first position, said combination chipper and shredder apparatus and vacuum machine is in a chipper and shredder mode and when said chute means is in [said] *a* second position said combination chipper and shredder apparatus and vacuum machine is in a vacuum mode.

4. A combination as in claim 1 and in which when said chute means is in [said] *a* first position said input end of said chute means is in an upward facing position and said combination chipper and shredder apparatus and [said] vacuum machine is in a chipper and shredder mode of operation and when said chute means is in [said] *a* second position said input end of said chute means is in a downward facing position and said combination chipper and shredder apparatus and vacuum machine is in a vacuum mode of operation.

9. A combination chipper and shredder [machine] *apparatus* and vacuum machine comprising:
    a) a housing having a first wall[,] *and* a second wall[, an inlet port and an outlet port combining to define] *defining* a chipping and shredding chamber, said chipping and shredding chamber for housing a chipper and shredder assembly, [said chipper and shredder assembly for chipping and shredding matter introduced into said chipping and shredding chamber through said inlet port] *said housing having an inlet port and an outlet port*;
    b) a drive means [mounted adjacent said housing and] coupled to said chipper and shredder assembly [for driving said chipper and shredder assembly rotationally on an axis passing through said chipper and shredder assembly, said drive means including a shaft extending through said second wall of said housing] *by a drive assembly, said drive assembly including a drive shaft extending from a power source, through said second wall and into said chipping and shredding chamber, said drive shaft defining a first axis longitudinally disposed with respect to said combination chipper and shredder apparatus and vacuum machine, said drive shaft coupled to said chipper and shredder assembly for rotating said chipper and shredder assembly*;
    c) a [hopper] *chute means defining a chamber* having an input end and an output end, said [hopper coupled to said first wall of said housing for maintaining communication between said inlet port of said housing and said output end of said hopper, for directing matter introduced into said hopper via said input end to said chipping and shredding chamber via said inlet port] *output end in communication with said inlet port, said chamber for directing matter introduced into said input end to said chipping and shredding chamber via said inlet port*; and
    d) a coupling means for coupling said [hopper] *chute means* to said first wall [of said housing said coupling means for permitting said hopper to be rotated on a second axis which is on a plane parallel to said axis, while maintaining communication between said inlet port of said housing and said output end of said hopper] *about said inlet port for permitting rotational movement by said chute means about said inlet port on a second axis, said second axis on a plane parallel to a plane of said first axis.*

*15. A combination chipper and shredder apparatus and vacuum machine as in claim 1 wherein said coupling means permits rotational movement of said chute means on said first wall of said housing, said chute means rotating on said second axis about said inlet port of said housing.*

*16. A combination chipper and shredder apparatus and vacuum machine as in claim 9 and in which rotational movement by said chute means defines an arc of 360 degrees of arc.*

\* \* \* \* \*